(12) United States Patent
Cho

(10) Patent No.: US 6,954,506 B2
(45) Date of Patent: Oct. 11, 2005

(54) CLOCK SIGNAL RECOVERY CIRCUIT USED IN RECEIVER OF UNIVERSAL SERIAL BUS AND METHOD OF RECOVERING CLOCK SIGNAL

(75) Inventor: Young-kyun Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 796 days.

(21) Appl. No.: 09/894,400

(22) Filed: Jun. 28, 2001

(65) Prior Publication Data

US 2002/0090043 A1 Jul. 11, 2002

(30) Foreign Application Priority Data

Jan. 5, 2001 (KR) ............................................. 2001-673

(51) Int. Cl.[7] ................................................ H03D 1/24
(52) U.S. Cl. ...................... 375/321; 375/375; 375/371; 375/362; 375/355; 327/159; 327/152
(58) Field of Search ................................ 375/321, 371, 375/375, 355, 362; 327/159, 152

(56) References Cited

U.S. PATENT DOCUMENTS

| | | | | |
|---|---|---|---|---|
| 5,850,422 A | * | 12/1998 | Chen | 375/371 |
| 6,031,886 A | * | 2/2000 | Nah et al. | 375/375 |
| 6,262,611 B1 | * | 7/2001 | Takeuchi | 327/159 |
| 6,373,911 B1 | * | 4/2002 | Tajima et al. | 375/375 |

* cited by examiner

Primary Examiner—Shuwang Liu
Assistant Examiner—Eva Zheng
(74) Attorney, Agent, or Firm—F. Chau & Associates LLC

(57) ABSTRACT

A clock signal recovery circuit that is implemented in a receiver of a universal serial bus (USB) and a method for recovering a clock signal. The clock signal recovery circuit comprises a phase detector, a bidirectional shift register, a multiphase clock signal generator, and a phase selector. The phase detector detects a difference in phases between received data and a predetermined recovery clock signal and generates a first control signal indicative of the detected phase difference. The shift register is shifted in response to the detected signal and outputs a second control signal. The multiphase clock signal generator receives a receiver clock signal having the same frequency as that of a clock signal used in a USB transmitter (from which the data is transmitted) and generates a plurality of phase clock signals, preferably, first through N-th phase clock signals having the same frequencies as that of the receiver clock signal and having differences of about (360/N)*I degree (°) (where N is an integer, and I is an integer equal to or greater than 0 and equal to or less than N−1) from a phase of the receiver clock signal, respectively. The phase selector selects one of the first through N-th phase clock signals in response to the second control signal and outputs the selected phase clock signal as the recovery clock signal. Preferably, N is an integer equal to or greater than 2 and equal to or less than 8.

16 Claims, 2 Drawing Sheets

CLOCK SIGNAL RECOVERY CIRCUIT USED IN RECEIVER OF UNIVERSAL SERIAL BUS AND METHOD OF RECOVERING CLOCK SIGNAL

BACKGROUND OF THE INVENTION

1. Technical Field

The present invention relates generally to communications equipment, and more particularly, to a clock signal recovery circuit preferably implemented in a receiver of a universal serial bus (USB) and a method for recovering a clock signal.

2. Description of Related Art

A universal serial bus (hereinafter referred to as USB) is an interface standard for peripheral devices of a personal computer (PC). The implementation of USB affords integration of a plurality of interfaces for various peripheral equipment, thereby allowing a PC to be readily connected to a plurality of peripheral equipment at low cost. Consequently, USB has been employed for use with many types of PCs and peripheral equipment.

A USB transmitter and a USB receiver (usually implemented in a single module, i.e., a USB transceiver) are necessary to communicate through the USB. In general, the same clock signal is used in the USB transmitter and the USB receiver. Thus, to recover data transmitted from the USB transmitter, the USB receiver must recover a clock signal having the same frequency and phase as the clock signal of the USB transmitter.

Conventional methods for recovering a clock signal typically include an analog method and a digital method. By way of example, FIG. 1 illustrates a conventional analog clock signal recovery circuit. The circuit comprises an analog phase locked loop (hereinafter referred to as PLL) circuit. The PLL circuit shown in FIG. 1 comprises a phase detector 12, a loop filter 14, and a voltage controlled oscillator (VCO) 16.

A recovery clock (RCCK) signal generated by a conventional PLL circuit is a signal having an arbitrary phase at the beginning of an operation. The phase of the RCCK signal is controlled by a control voltage (VCON) generated by the phase detector 12 and the loop filter 14. The VCO 16 generates the RCCK signal having a phase that is varied by the control voltage VCON. The RCCK signal is fed back to the phase detector 12 so that a phase of the RCCK signal may be compared with the phase of received data (R_DATA). The above operation will be repeated until the phases of the RCCK signal and the R_DATA are synchronized, at which time the PLL circuit is "locked."

One disadvantage associated with the conventional PLL circuit is the time delay for recovering the RCCK signal synchronized with the R_DATA. To combat this delay associated with the conventional analog clock signal recovery method, a digital clock signal recovery method can be implemented to obtain a fast synchronous time. In general, with this method, a delay locked loop (hereinafter, referred to as DLL) circuit is used for controlling phase via a digital delay line. One disadvantage associated with the DLL method is that the DLL circuit comprises a multistage digital delay line and, consequently, the DLL circuit is large and consumes much power.

As communication technology has progressed, the USB standard has also progressed. Currently, the USB 2.0 standard has been standardized. USB 2.0 requires the USB receiver to recover a clock signal within a short preamble, that is, within a 4-clock period. Thus, a clock signal can be recovered within a short time (4-clock period). Accordingly, a clock signal recovery circuit that is small in size, consumes little power, and that can recover a clock signal within a short period is highly desirable.

SUMMARY OF THE INVENTION

The present invention is directed to a circuit and method for recovering data in a communications system. A clock signal recovery circuit according to a preferred embodiment of the present invention is implemented in a USB (universal serial bus) receiver, wherein the clock signal recovery circuit provides recovery of a clock signal in a time period that satisfies the USB 2.0 standard.

In one aspect of the present invention, a circuit for recovering a clock signal in a USB (universal serial bus) receiver comprises:

a phase detector for detecting a phase difference between data received from a USB transmitter and a recovery clock signal and generating a first control signal indicative of a detected phase difference;

a bidirectional shift register for outputting a second control signal in response to the first control signal;

a multiphase clock signal generator for processing a receiver clock signal of the USB receiver, wherein the receiver clock signal is the same as a transmitter clock signal of the USB transmitter, to generate a plurality of phase clock signals each having the same frequency as the receiver clock signal and a different phase offset from the phase of the receiver clock signal; and a phase selector responsive to the second control signal for selecting one of the plurality of phase clock signals and outputting the selected phase clock signal as a recovery clock signal.

In another aspect, the plurality of phase clock signals comprise first through N-th phase clock signals, wherein the different phase offsets of the first through N-th phase clock signals are about $(360/N)*I$ degrees, where N is an integer, and I is an integer equal to or greater than 0 and equal to or less than N−1.

Preferably, wherein N is an integer equal to or greater than 2 and equal to or less than 8.

In yet another aspect of the present invention, the circuit comprises a clock signal generator for generating the receiver clock signal.

In another aspect of the present invention, a method for recovering a clock signal in a USB (universal serial bus) receiver comprises the steps of:

receiving a receiver clock signal of the USB receiver having a frequency equal to the frequency of a transmitter clock signal of a USB transmitter, and generating a plurality of phase clock signals from the receiver clock signal, where each phase clock signal has the same frequency as the receiver clock signal and a different phase offset from the phase of the receiver clock signal;

detecting a phase difference between data received from the USB transmitter and a recovery clock signal and generating a first control signal indicative of a detected phase difference;

outputting a second control signal from a bidirectional shift register in response to the first control signal; and selecting one of the plurality of phase clock signals in response to the second control signal and outputting the selected phase clock signal as a recovery clock signal.

Preferably, the step of generating a plurality of phase clock signals comprises the step of generating first through N-th phase clock signals, wherein the different phase offsets of the first through N-th phase clock signals are about (360/N)*I degrees, where N is an integer and I is an integer equal to or greater than 0 and equal to or less than N−1. Further, N is preferably an integer equal to or greater than 2 and equal to or less than 8.

In yet another aspect of the present invention, a program storage device readable by a machine is provided, where the program storage device tangibly embodies instructions executable by the machine to perform method steps for recovering a clock signal in a communications system comprising a transmitter and receiver, wherein the method steps comprise:

receiving a receiver clock signal of the receiver having a frequency equal to the frequency of a transmitter clock signal of the transmitter, and generating a plurality of phase clock signals from the receiver clock signal, where each phase clock signal has the same frequency as the receiver clock signal and a different phase offset from the phase of the receiver clock signal;

detecting a phase difference between data received from the transmitter and a recovery clock signal and generating a first control signal indicative of a detected phase difference;

outputting a second control signal from a bidirectional shift register in response to the first control signal; and selecting one of the plurality of phase clock signals in response to the second control signal and outputting the selected phase clock signal as a recovery clock signal.

In another aspect of the present invention, a communications system comprises:

a transmitter; and a receiver comprising means for recovering a clock signal, wherein the means for recovering a clock signal comprises:

phase detecting means for detecting a phase difference between data received from the transmitter and a recovery clock signal and generating a first control signal indicative of a detected phase difference;

bidirectional shift register means for outputting a second control signal in response to the first control signal;

multiphase clock signal generating means for generating a plurality of phase clock signals each having the same frequency as a receiver clock signal of the receiver and a different phase offset from the phase of the receiver clock signal; and selecting means responsive to the second control signal for selecting one of the plurality of phase clock signals and outputting the selected phase clock signal as a recovery clock signal.

Advantageously, the present invention provides a mechanism for recovering a clock synchronized with data received from the USB transmitter within a short time (4-clock period).

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

Figure 1:
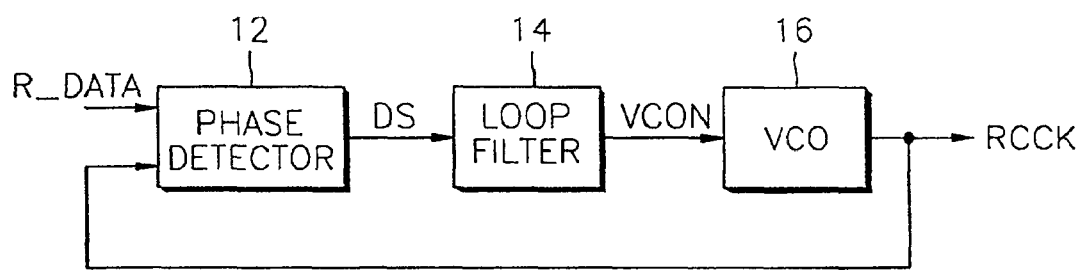
FIG. 1 is a block diagram illustrating a conventional analog clock signal recovery circuit.
Figure 2:
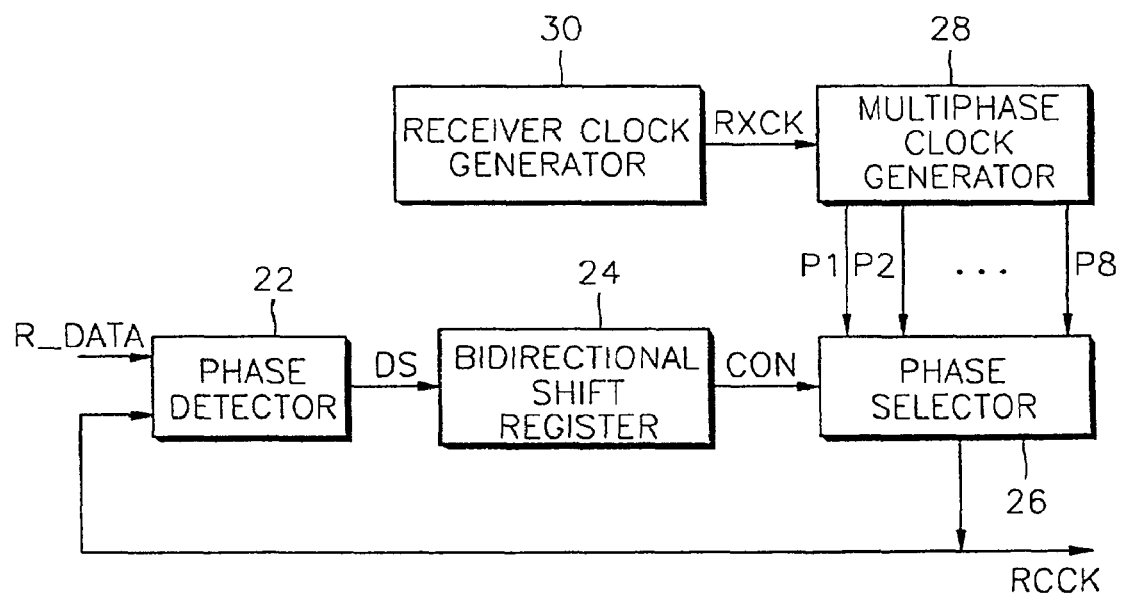
FIG. 2 is a block diagram illustrating a clock signal recovery circuit according to an embodiment of the present invention.

FIG. 2 illustrates a clock signal recovery circuit according to an embodiment of the present invention. A clock signal recovery circuit comprises a phase detector 22, a shift register 24, a phase selector 26, a multiphase clock signal generator 28, and a receiver clock signal generator 30. The phase detector 22 receives data R_DATA transmitted from a universal serial bus (USB) transmitter (not shown) via one terminal and a recovery clock (RCCK) signal via another terminal. The phase detector 22 compares and detects phases of two signals R_DATA and RCCK and generates a detected signal (DS). In response to the DS signal, the bidirectional shift register 24 is shifted in one of two directions to generate a control signal CON. In response to the control signal CON, the phase selector 26 selects one of a plurality of phase clock signals (e.g., P1 through P8) output from the multiphase clock signal generator 28 and outputs the selected phase clock signal as the RCCK signal.

The multiphase clock signal generator 28 receives a receiver clock (RXCK) signal (which is generated by the receiver clock signal generator 30) and generates first through N-th phase clock signals P1 through PN, each having the same frequency of the RXCK signal, but a different phase offsets of about (360/N)*I degree (°) from the phase of the RXCK signal, respectively, where I is an integer inclusive of and between 0 and N−1. Thus, the first through N-th phase clock signals P1 through PN are clock signals having phase differences as much as that divided by N when one cycle of the RXCK signal divided by N. For example, in a preferred embodiment wherein N=8, phase clock signals P1 through P8 are output from the multiphase clock signal generator 28 and the phase clock signals P1 through P8 respectively have phase offsets of about 0°, 45°, 90°, 135°, 180°, 225°, 270°, and 315° from the phase of the RXCK signal. As explained below, when N=8, synchronization of the RCCK signal with the R_DATA signal can advantageously be performed within a 4-clock period and the smallest phase error occurs during the synchronization. As a result, an assumption is made that even in the embodiment, the eight phase clock signals P1 through P8 are output from the multiphase clock signal generator 28.

It is to be appreciated that the multiphase clock signal generator 28 can be implemented by a multiphase analog PLL circuit for generating signals having same frequencies and different phases.

The receiver clock signal generator 30 generates the RXCK signal. The RXCK signal is a clock signal having the same frequency as that of a clock signal used to transmit the R_DATA signal from the USB transmitter (not shown). The RXCK signal may be a clock signal generated directly by a clock signal generator such as a crystal oscillator, or a clock signal in which a clock signal generated by the crystal oscillator is multiplied by a desired frequency.

In a preferred embodiment where N=8, the phase selector 26 selects one of the eight phase clock signals P1 through P8 and generates the recovery clock RCCK signal. Thus, preferably, the shift register 24 for generating the CON for controlling the phase selector 26 is a shift register having eight states. An operation of the shift register 24 and selection of the plurality of phase clock signals P1 through P8 will be described more fully with reference to FIG. 3.

Figure 3:
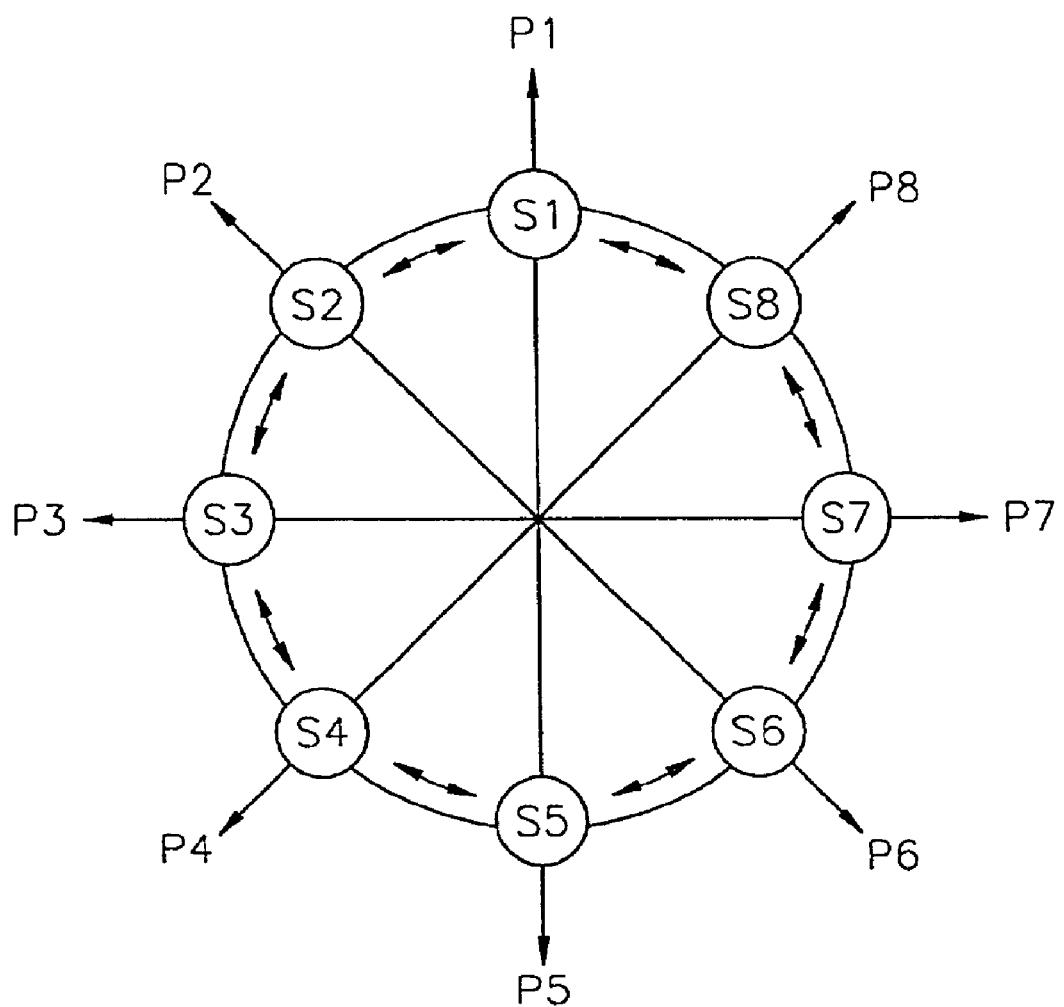
FIG. 3 is a state diagram illustrating states of a shift register shown in FIG. 2 and a phase clock signal selected by the states of the shift register.

Referring now to FIG. 3, a state diagram illustrates the state of a shift register shown in FIG. 2 and a phase clock signal selected by the state of the shift register. The shift register 24 can be bidirectionally shifted and preferably comprises eight states S1 through S8. One phase clock signal is selected from the first through N-th phase clock signals P1 through P8 by the CON corresponding to each state and output as the RCCK signal. As shown in FIG. 3, in the case where the shift register 24 is in a state of S1, the first phase clock signal P1 is selected, and in the case where the shift register 24 is in a state of S2, the second phase clock signal P2 is selected. Likewise, when the shifter register 24 is in a state of S3, S4, S5, S6, S7, or S8, the third phase clock signal P3, the fourth phase clock signal P4, the fifth phase clock signal P5, the sixth phase clock signal P6, the seventh phase clock signal P7, and the eighth phase clock signal P8 are selected, respectively.

The DS output from the phase detector 22 shifts the shift register 24 clockwise or counterclockwise. The DS may be a digital signal of logic low or logic high. By way of example, when the phase of the R_DATA signal is ahead of that of the RCCK signal, the DS of logic high is output, and when the phase of the R_DATA signal lags that of the RCCK signal, the DS of logic low is output. Further, when the DS is logic high, the shift register 24 is shifted counterclockwise, and in when the DS is logic low, the shift register 24 is shifted clockwise, so that the state of the shift register 24 is transited.

In FIG. 3, assuming that the initial state of the shift register 24 is S1 and the phase clock signal, whose phase is synchronized with the R_DATA signal, is the fourth phase clock signal P4, the shift register 24 is shifted counterclockwise in response to the DS. That is, the shift register 24 is shifted counterclockwise three times, as a result, the state of the shift register 24 is transited into the state of S4, and the fourth phase clock signal P4 as a phase clock signal corresponding to S4 is selected as the RCCK signal. Further, if the phase clock signal, whose phase is synchronized with the R_DATA signal, is the seventh phase clock signal P7, the shift register 24 is shifted clockwise twice from the initial state S1 to the state of S7 in response to DS. Thus, even when the largest possible phase difference exists (i.e., a phase difference of 180°), the phase of the RCCK signal can be synchronized with the R_DATA signal within 4-clock periods.

It is to be appreciated that if the number of the phase clock signals, N, is smaller than 8, for example, 4, synchronization of the RCCK signal with the R_DATA signal can be performed even more quickly, but with lower resolution of the phase. That is, when N is 8, the phase difference of each phase clock signal is 360/8 or 45 degrees, whereas when N is 4, the phase difference of each phase clock signal is 360/4 or 90 degrees.

Advantageously, the present invention provides a significant improvement over conventional clock recovery circuits and methods. Indeed, a clock signal recovery circuit according to the present invention can obtain a recovery clock signal synchronized with the received data by selecting one phase clock signal having the least phase errors among multiphase clock signals, as compared with conventional methods such as the DLL circuit that delay one phase clock signal. Consequently, the time required to recover a clock signal is significantly reduced. Further, by not having to implement a multistage delay line, the area of the clock signal recovery circuit and power consumption can be reduced.

The present invention can be implemented in any suitable system. For instance, the present invention is preferably implemented for recovering clock signals in a USB system. Indeed, a clock signal recovery circuit having an architecture as described herein can not only afford reduced power consumption and utilize less space, it satisfies the USB 2.0 standard which requires clock signal recovery within a 4-clock period.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A circuit for recovering a clock signal in a USB (universal serial bus) receiver, the circuit comprising:
    a phase detector for detecting a phase difference between data received from a USB transmitter and a recovery clock signal and generating a first control signal indicative of a detected phase difference;
    a bidirectional shift register for outputting a second control signal in response to the first control signal;
    a multiphase clock signal generator for processing a receiver clock signal of the USB receiver, wherein the receiver clock signal is the same as a transmitter clock signal of the USB transmitter, to generate a plurality of phase clock signals each having the same frequency as the receiver clock signal and a different phase offset from the phase of the receiver clock signal; and
    a phase selector responsive to the second control signal for selecting one of the plurality of phase clock signals and outputting the selected phase clock signal as a recovery clock signal,
    wherein the plurality of phase clock signals comprise first through N-th phase clock signals, wherein the different phase offsets of the first through N-th phase clock signals are about (360/N)I degrees, where N is an integer, and I is an integer equal to or greater than 0 and equal to or less than N−1.

2. The circuit of claim 1, wherein N is an integer equal to or greater than 2 and equal to or less than 8.

3. The circuit of claim 1, wherein N is 8.

4. The circuit of claim 1, wherein the bidirectional shift register is shifted in a first direction when the first control signal is at a first predetermined level, and shifted in a second direction when the first control signal is at a second predetermined level.

5. The circuit of claim 1, wherein the multiphase clock signal generator comprises a multiphase analog PLL (phase locked loop) circuit.

6. The circuit of claim 1, further comprising a clock signal generator for generating the receiver clock signal.

7. The circuit according to claim 6, wherein the clock signal generator comprises:
    a crystal oscillator for generating a clock signal having a predetermined frequency; and
    a frequency multiplier for multiplying the frequency of the clock signal to generate the receiver clock signal.

8. A method for recovering a clock signal in a USB (universal serial bus) receiver, the method comprising the steps of:
    receiving a receiver clock signal of the USB receiver having a frequency equal to the frequency of a transmitter clock signal of a USB transmitter, and generating a plurality of phase clock signals from the receiver clock signal, wherein each phase clock signal has the same frequency as the receiver clock signal and a different phase offset from the phase of the receiver clock signal;

detecting a phase difference between data received from a USB transmitter and a recovery clock signal and generating a first control signal indicative of a detected phase difference;

outputting a second control signal from a bidirectional shift register in response to the first control signal; and selecting one of the plurality of phase clock signals in response to the second control signal and outputting the selected phase clock signal as a recovery clock signal, wherein the step of generating a plurality of phase clock signals comprises the step of generating first through N-th phase clock signals, wherein the different phase offsets of the first throuah N-th phase clock signals are about (360/N)I degrees, where N is an integer, and I is an integer equal to or greater than 0 and equal to or less than N−1.

9. The method of claim 8, wherein N is an integer equal to or greater than 2 and equal to or less than 8.

10. The method of claim 8, wherein N is 8.

11. A program storage device readable by a machine, tangibly embodying a program of instructions executable by the machine to perform method steps for recovering a clock signal in a communications system comprising a transmitter and receiver, the method steps comprising:

receiving a receiver clock signal of the receiver having a frequency equal to the frequency of a transmitter clock signal of the transmitter, and generating a plurality of phase clock signals from the receiver clock signal, wherein each phase clock signal has the same frequency as the receiver clock signal and a different phase offset from the phase of the receiver clock signal;

detecting a phase difference between data received from the transmitter and a recovery clock signal and generating a first control signal indicative of a detected phase difference;

outputting a second control signal from a bidirectional shift register in response to the first control signal; and selecting one of the plurality of phase clock signals in response to the second control signal and outputting the selected phase clock signal as a recovery clock signal, wherein the instructions for generating a plurality of phase clock signals comprise instructions for generating first through N-th phase clock sianals, wherein the different phase offsets of the first through N-th phase clock signals are about (360/N)I degrees, where N is an integer, and I is an integer equal to or greater than 0 and equal to or less than N−1.

12. The program storage device of claim 11, wherein the method steps are implemented in a USB (universal serial bus) communications system.

13. A communications system, comprising:

a transmitter; and a receiver comprising means for recovering a clock signal, wherein the means for recovering a clock signal comprises:

phase detecting means for detecting a phase difference between data received from the transmitter and a recovery clock signal and generating a first control signal indicative of a detected phase difference;

bidirectional shift register means for outputting a second control signal in response to the first control signal;

multiphase clock signal generating means for generating a plurality of phase clock signals each having the same frequency as a receiver clock signal of the receiver and a different phase offset from the phase of the receiver clock signal; and selecting means responsive to the second control signal for selecting one of the plurality of phase clock signals and outputting the selected phase clock signal as a recovery clock signal, wherein the plurality of phase clock signals comprise first through N-th phase clock signals, wherein the different phase offsets of the first through N-th phase clock signals are about (360/N)I degrees, where N is an integer, and I is an integer equal to or greater than 0 and equal to or less than N−1.

14. The system of claim 13, wherein the communications system comprises a USB (universal serial bus) communications system.

15. The system of claim 13, wherein N is an integer equal to or greater than 2 and equal to or less than 8.

16. The system of claim 13, wherein N is 8.

* * * * *